Jan. 29, 1952  I. FEUER  2,583,690
VARIABLE REFLEX OPTICAL PROJECTION
SYSTEM FOR WEIGHING SCALES
Filed Dec. 31, 1949  4 Sheets-Sheet 2

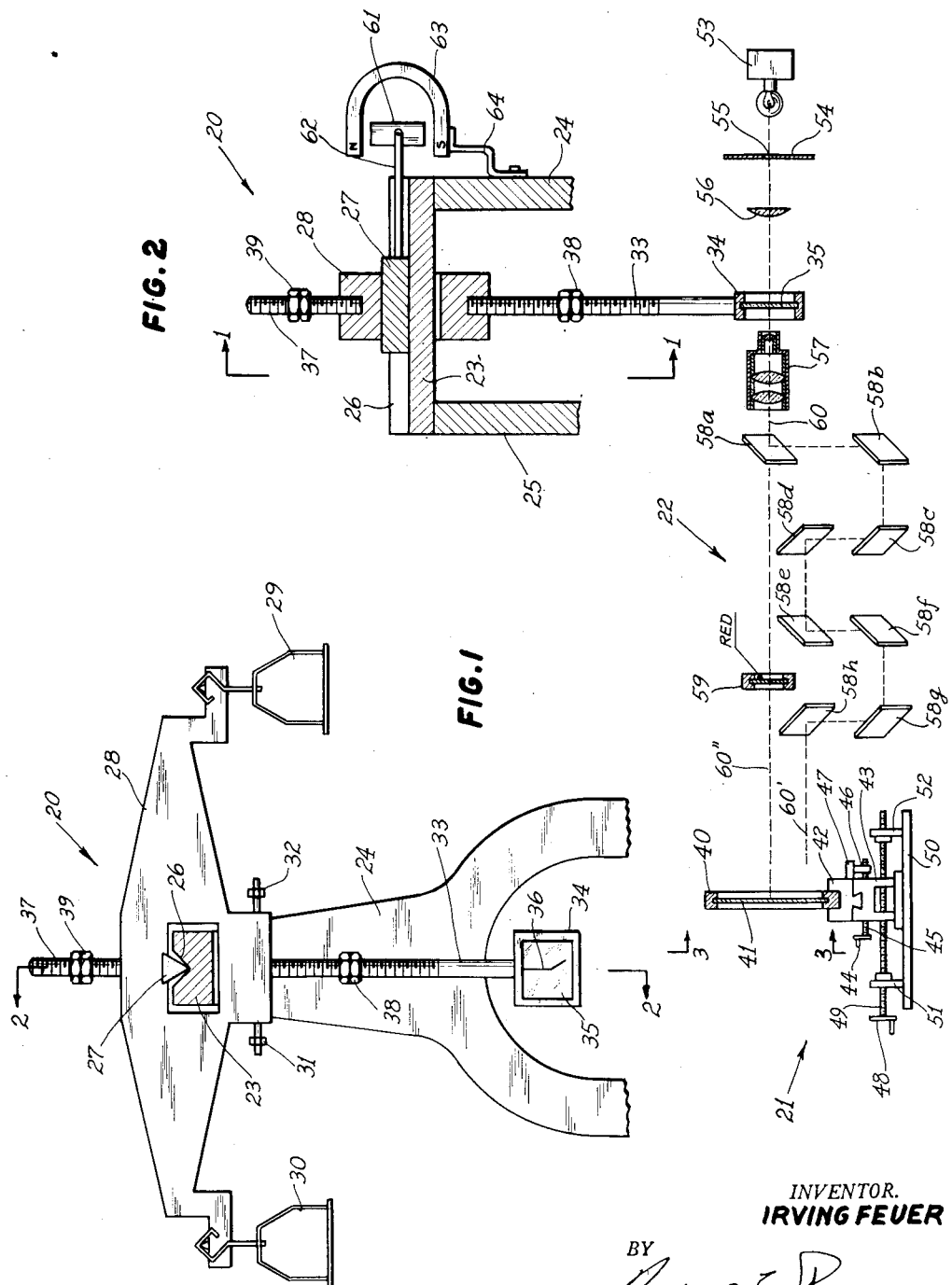

INVENTOR.
IRVING FEUER
BY
ATTORNEY

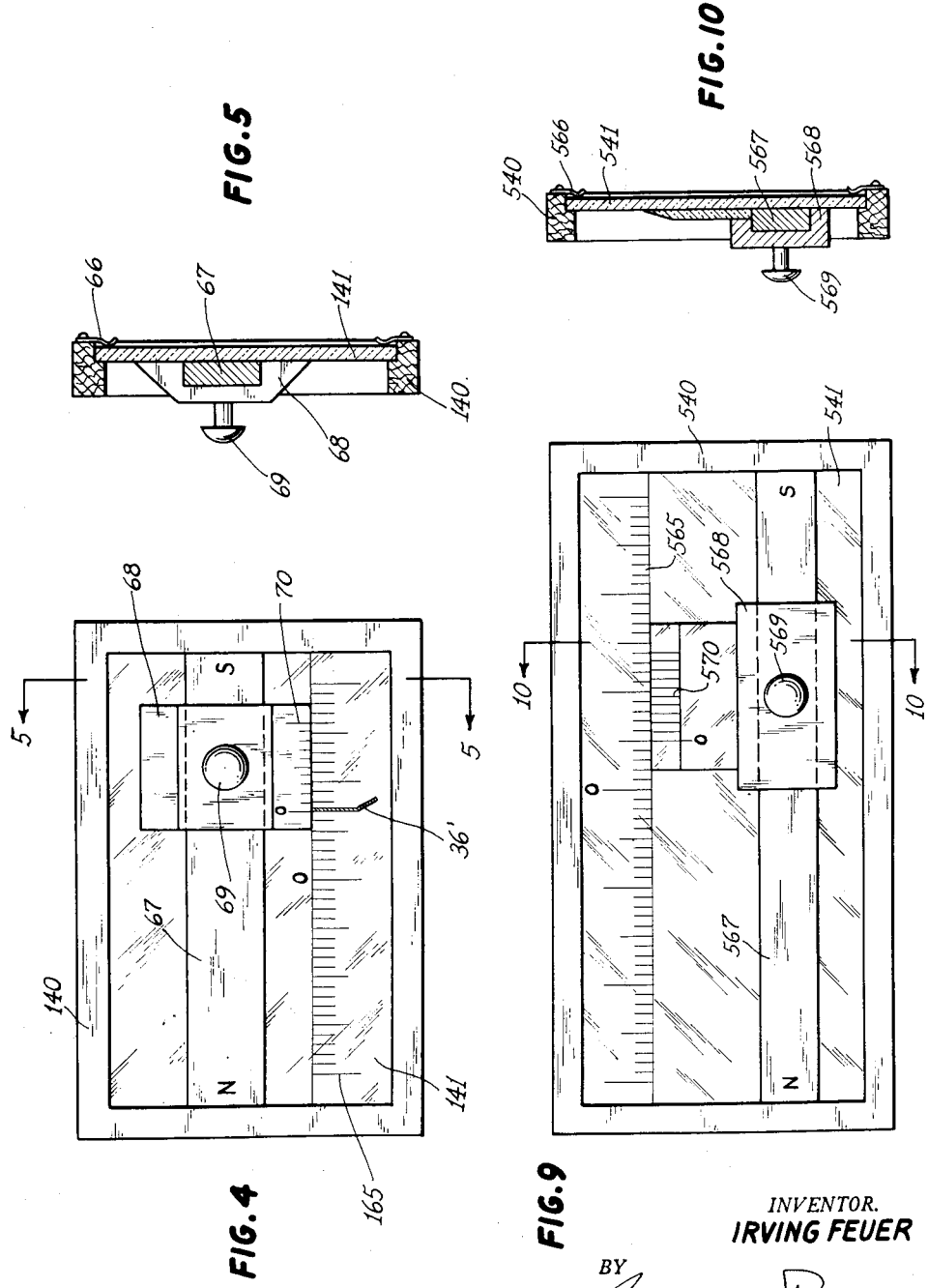

Jan. 29, 1952　　　　　I. FEUER　　　　　2,583,690
VARIABLE REFLEX OPTICAL PROJECTION
SYSTEM FOR WEIGHING SCALES
Filed Dec. 31, 1949　　　　　　　　　　　4 Sheets-Sheet 4
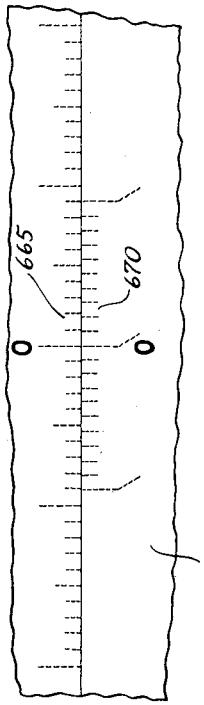
FIG.12
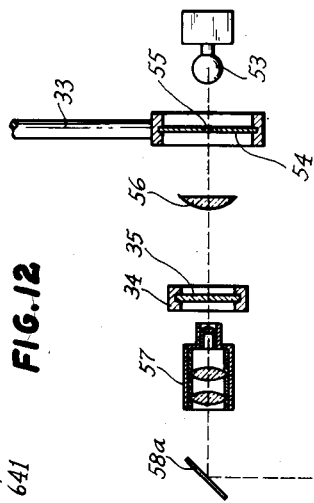
FIG.8
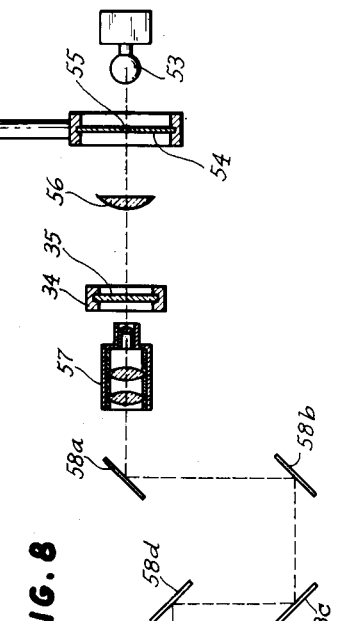
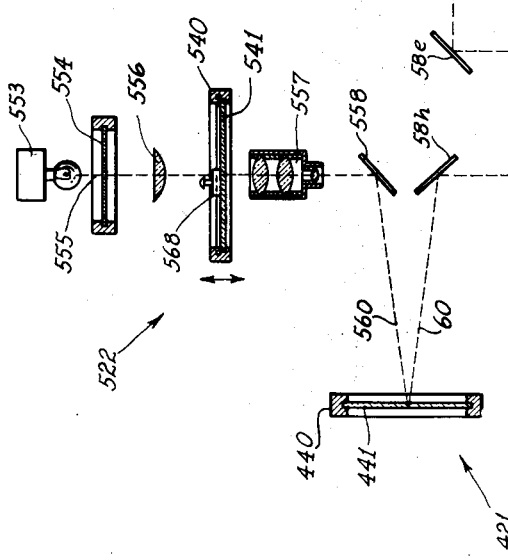
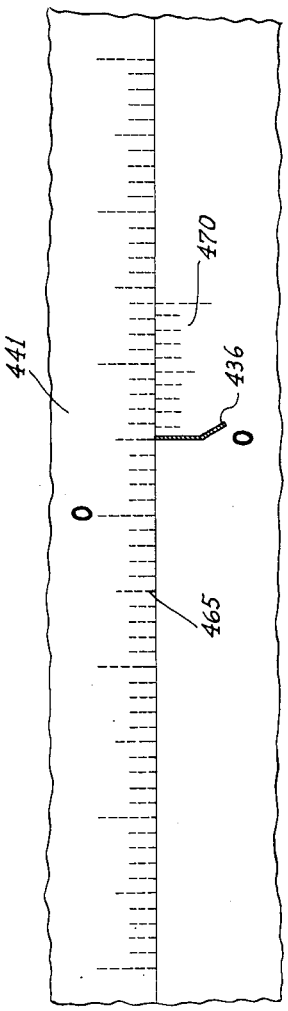
FIG.11
INVENTOR.
IRVING FEUER
BY
ATTORNEY Patented Jan. 29, 1952

2,583,690

UNITED STATES PATENT OFFICE 2,583,690

VARIABLE REFLEX OPTICAL PROJECTION SYSTEM FOR WEIGHING SCALES

Irving Feuer, Bronx, N. Y., assignor of one-half to Maxwell E. Sparrow, New York, N. Y.

Application December 31, 1949, Serial No. 136,358

4 Claims. (Cl. 88—24)

My present invention relates to weighing scales and balances.

An object of this invention is to provide a new and improved weighing scale adapted particularly for the precise detection and determination of weights or weight increments of the order of micrograms.

Another object of my invention is to provide, in a weighing scale of the reflex optical balance type, means enabling certain adjustments to be made without in any way interfering with the balance of the system.

Further, more particular objects of the invention, allied with the preceding one, include, in a weighing scale of the character set forth, the provision of means for (a) zeroizing the instrument, (b) adjusting its sensitivity, (c) operating a vernier, all without affecting the balance of the system.

Yet another object of the present invention is to provide, in a weighing scale, a single optical indicating system having means adapted to give a plurality of simultaneous indications corresponding to different degrees of sensitivity, such as a "coarse" and a "fine" indication.

It is known that scales operating with a high center of gravity display certain disadvantages, such as a noticeable variation of sensitivity with load. It is, therefore, a still further object of the instant invention to provide a weighing scale combining some or all of the features set out above with the advantage of a relatively low center of gravity.

More specifically, it has been proposed to provide the indicator arm of a weighing scale, of the general character envisaged by the present invention, with a scale or reticle forming part of an indicating system in which the displacement of the scale, relative to a stationary mark, was enlarged by optical means. In such a scale the use of a relatively high center of gravity was dictated by the fact that, if it was desired to indicate very small weights, the enlargement required would also unduly enlarge any inaccuracies of the reticle itself unless the extent of the optical magnification was limited by an ample ratio of displacement of the indicator arm per unit of weight. It is, therefore, still another object of my invention to provide a weighing scale of this character in which the displacement of the indicator arm may be magnified to a considerable extent without entraining the aforementioned disadvantage of increasing the importance of pre-existing inaccuracies.

In order to accomplish the above objects and others that will become subsequently apparent, the invention provides, in accordance with one of its features, a balancing instrument having a movable indicator arm which carries an indicating element such as, for example, a hair line or other mark formed on a transparent background, and, in combination therewith, a reticle-bearing member detached from the balancing instrument and connected therewith solely through the intermediary of an optical magnifying system which causes the image of the indicating element to fall upon the reticle, the reticle-bearing member being displaceable relative to the instrument to provide the desired degree of sensitivity.

The reticle or scale may be bodily affixed to the reticle-bearing member, as by printing or engraving, or it may be projected thereupon by an auxiliary optical system. A vernier, co-operating with the reticle, may be physically attached to the reticle-bearing member or may be projected thereupon either by the main or by an auxiliary optical system.

According to another feature of the invention, the main optical system, operatively connecting the balancing instrument with the reticle-bearing member, may include a plurality of paths for light rays originating at a suitable source and deflected a number of times to give the desired magnification of displacement the effective lengths of these paths being different so as to produce a plurality of images of the indicating element upon the reticle-bearing member which move at different speeds from their respective zero positions, thereby enabling "coarse" and "fine" readings to be made simultaneously.

The invention will be described in detail with reference to the accompanying drawing in which:

Fig. 1 is a front elevation, partly in section on the line 1—1 of Fig. 2, of a balancing instrument forming part of a first embodiment of the invention;

Fig. 2 is a fragmentary section on the line 2—2 of Fig. 1 and also shows the reticle-bearing member and the optical system associated with the instrument;

Fig. 4 is a view similar to Fig. 3, showing a modification of the reticle-bearing member;

Fig. 5 is a section taken on the line 5—5 of Fig. 4;

Fig. 8 is a view similar to the left-hand portion of Fig. 2, showing the provision of a main as well as an auxiliary optical system;

Fig. 9 is a view similar to Fig. 3 representing, however, an auxiliary reticle-bearing member forming part of the auxiliary optical system of Fig. 8;

Fig. 10 is a section taken on the line 10—10 of Fig. 9;

Fig. 11 is a view similar to Figs. 6, 7, showing the indications appearing on the main reticle-bearing member of the system of Fig. 8; and Fig. 12 is another view similar to Figs. 6, 7 and 11, showing a partial combination of the systems illustrated in Figs. 6 and 11.

Figure 7:
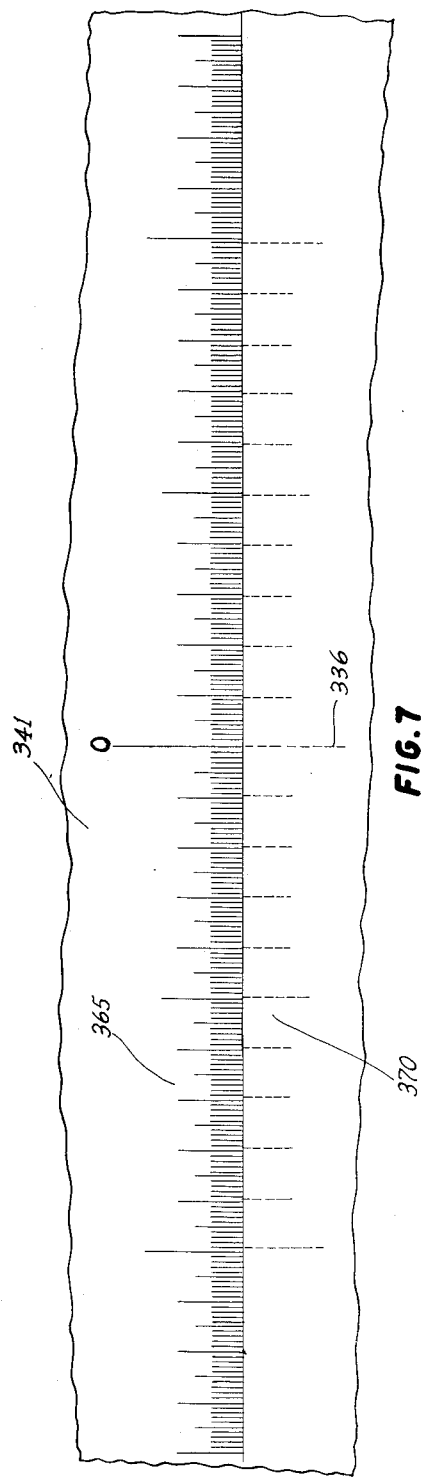
Fig. 7 is a view similar to Fig. 6, showing a modified form of vernier.

Referring first to Figs. 1 and 2 for a description of the principal parts of a weighing scale according to the invention, there is shown a balancing instrument generally indicated at 20, an indicator unit 21 spaced and physically detached from the instrument 20, and an optical system generally designated 22. The balance 20 comprises a horizontal bar 23, supported on a pair of spaced uprights 24, 25 and provided with a V-shaped groove 26 which pivotally supports the blade 27 of the oscillating beam 28. The beam shown is of the simple type, carrying a pan 29, 30 on each end, although it will be understood that other types of beams, e. g. beams having a rider for setting up fractional units of weight, may be employed. Adjusting screws 31, 32 serve to obtain an initial balance (rough zeroizing).

A rod or arm 33, depending from the beam 28, carries at its lower extremity a window formed by a frame 34 and a transparent member 35, the latter having engraved therein a hair line 36 representing the indicating element. The hair line 36 is preferably unsymmetrical, as shown, for a purpose that will subsequently appear. A similar, shorter rod 37 extends upwardly from the beam 28, in alignment with the arm 33, and the two rods carry adjusting nuts 38, 39 permitting a rough, preliminary adjustment of the instrument's sensitivity.

It will be noted that the configuration of the beam 28 and the position of the frame 34 on the rod 33 are such that the instrument 20 has a low center of gravity, in keeping with one of the objects previously announced.

The indicating unit 21 comprises a reticle-bearing member represented here as a frame 40 which holds a ground glass or similar transparent element 41. The frame 40 is mounted on a carriage comprising two portions 42, 43 which are displaceable relative to each other, in the plane of the element 41, by means of a crank 44 provided on a shaft 45 which passes through the lower carriage portion 43 and holds a pinion 46, the latter meshing with a rack 47 extending from the upper portion 42. Carriage portion 43, in turn, is displaceable in a direction transverse to the transparent element 41 by means of crank 48 provided on a lead screw 49 which passes through the internally legs of portion 43, the lead screw being journaled in lugs 51, 52 rising from a base plate 50.

The optical system 22 includes a source of light 53, a diaphragm 54 having a limiting aperture 55, a plano-convex lens 56 ahead of the object 35, a microscope 57 back at that object, and a set of deflectors here shown as mirrors 58a through 58b through which the light rays 60, emerging from the ocular end of the microscope 57, are directed toward the receiving surface 41 over a devious path 60' of great effective length. Furthermore, in this embodiment, the first mirror 58a is shown of the semi-transparent type, allowing a portion of the rays to travel toward the surface 41 over a relatively short path 60'' which includes the color filter 59.

The oscillatory system of the balance 20 may be damped by any suitable means, such as an electromagnetic damping arrangement. Fig. 2 shows a conductive blade 61 secured to the free end of a rod 62 extending from the pivotal blade 27; this blade oscillates between the poles of a horseshoe magnet 63 supported from the upright 24 by means of a bracket 64.

Figure 3:
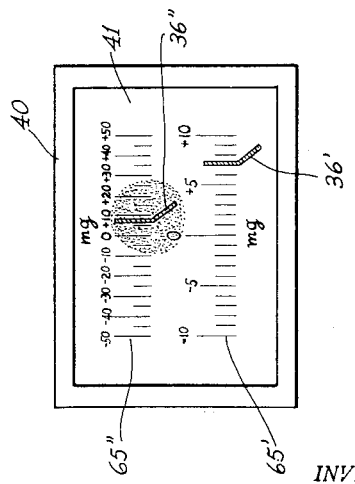
Fig. 3 is a front elevation, on the line 3—3 of Fig. 2, but drawn to a larger scale, of the transparent member bearing the reticle.

Turning now to Fig. 3, there is shown the transparent element 41, held by the frame 40, upon which impinge the images 36', 36'' of the indicating element 36 (Fig. 1). Image 36', which is due to the light rays travelling over the longer path 60', registers with a scale 65' calibrated to give relatively small units of weight (e. g. 5 mg.) for a given displacement (e. g. 1 cm.) of mark 36'; image 36'', which is due to the light rays traveling over the shorter path 60'', registers with a scale 65'' calibrated to give relatively large units of weight (e. g. 25 mg.) for a corresponding displacement of mark 36''. It will be understood, of course, that the ratio of the lengths of the two paths 60', 60'' will be selected so that both marks show the same weight on their respective scales.

By virtue of the provision of the color filter 59, the mark 36'' may be given an appearance distinct from that of mark 36' by being displayed, for example, in the midst of a red field. One of the advantages of the provision of a plurality of images on the same indicating surface, such as 36' and 36'', is that coarse weighings may be carried out over a range representing a multiple of the range within which fine measurements are possible. Also, the presence of the mark 36'', by the sense of its displacement, will indicate immediately upon which of the pans 29, 30 a rebalancing weight will have to be placed in order to bring the mark 36' back into registry with the scale 65' after the mark has been deflected out of the field of vision.

The unsymmetrical configuration of the hair line 36, produced by joining together two lines enclosing an obtuse angle, is designed to insure that readings be taken in such manner as to avoid the effects of a broadening of the hair line by the optical magnifying system. For this purpose, the system is initially zeroized by aligning the zero line of scale 65' with the outer, i. e. left-hand, edge of the vertical portion of mark 36' and using this same edge, readily indentified by the angular configuration of the mark, for all subsequent readings. In Fig. 3, therefore, the reading is exactly seven milligrams.

It will be understood that, with the arrangement just described, any change in sensitivity may be carried out without upsetting the balance of the instrument 20. For this purpose it is merely necessary to replace the ground glass 41 with a similar transparent member, bearing different calibrations, and thereupon turn the crank 48 until the distance of the new indicating surface or target from the indicator member 35 is such that a standard displacement of the beam 28, brought about by placing a predetermined weight upon one of the pans, will give the corresponding reading. The reticle-bearing member may be accurately zeroized by operating the crank 44.

Referring to Figs. 4 and 5, there I have shown the use of an adjustable vernier in combination with the above-described weighing system. The frame 140 is provided with clamps 66 which removably hold in place the ground glass 141 bearing a scale 165, there being further provided a bar 67 extending across the frame 140 parallel to the scale 165; a slide 68, having a knob 69 to facilitate its horizontal displacement, is movably held on the bar 67 which for this purpose is represented by a permanent magnet of rectangular cross section. The slide 68 carries a vernier scale 70 having nine divisions for each ten divisions of the scale 165. By aligning the zero line of vernier scale 70 with the left-hand edge of mark 36', the displacement of this mark may be determined with an accuracy of one-tenth of a division of scale 165' which division, for a given distance of the surface 141 from the microscope 57, may correspond, say, to one-tenth of a milligram so that tens of micrograms may be read on the vernier. The provision of the bar magnet 67 to support the slide 68 enables a quick and convenient interchanging of verniers without requiring extensive disassembly of the indicator unit 21.

Figure 6:
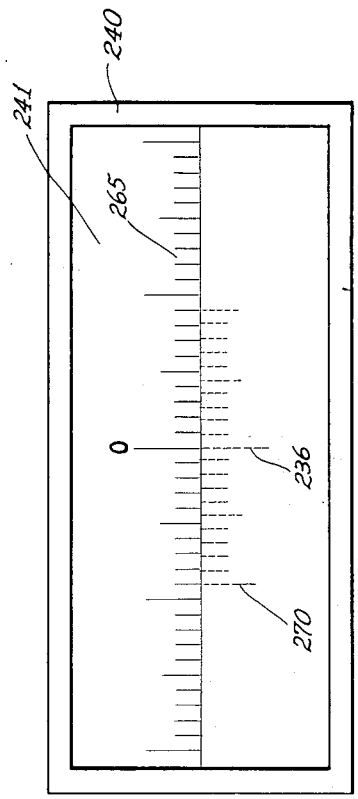
Fig. 6 is a view similar to Fig. 3 in which, however, the image of the hair line representing the indicating element of Fig. 1 has been replaced by a projected vernier.

Fig. 6 shows a modified target plate 241, held within a frame 240 and bearing a reticle 265 co-operating with a vernier reticle 270, the latter having nine divisions for each ten divisions of the reticle 265. The reticle or scale 270, shown in dotted lines, is projected upon the plate 241 by means of the optical system 22, its zero line 236 corresponding to the hair line 36 shown in Fig. 1. It will thus be seen that with this arrangement readings accurate to one-tenth of a division of the reticle 265 may be obtained without the use of a separate vernier member such as the slide 68 in Figs. 4 and 5.

The arrangement of Fig. 7 is similar to that of Fig. 6, except that the plate 341 bears now a reticle 365 co-operating with a projected vernier 370 which has 99 divisions for each 100 divisions of the reticle 365. Under the conditions previously assumed, readings of one microgram may now be made with great accuracy. The zero line 336 of projected scale 370 again serves as the reference mark corresponding to line 36 of Fig. 1.

A somewhat different arrangement is shown in Fig. 8. Here the image of an indicating element, which may be identical with the line 36 in Fig. 1, is shown upon a target plate 441 held in a frame 440, by the main optical system 422 which establishes a path 60 for the light rays coming from lamp 53; at the same time the rays of a source 553, passing through an auxiliary optical system 522 including the aperture 555 of a diaphragm 554, a lens 556, a scale-bearing transparent member 541 held in a frame 540, and a microscope 557, are deflected by a mirror 558 along a path 560 to impinge upon the same target plate 441. As shown in Figs. 9 and 10, the frame 540 carries a bar magnet 567 supporting a vernier slide 568 having a knob 569. The entire arrangement shown in Figs. 9 and 10 is similar to that of Figs. 4 and 5, except that the portion of slide 568 carrying the vernier scale 570, which co-operates with the reticle 565, is of transparent material to permit the passage of the rays of light emitted by the source 553. Both the element 568 and the plate 541 are readily replaceable, plate 541 being held in the frame 540 by clamps 566.

Fig. 11 shows how the image 436 of hair line 36 is projected upon the plate 441 along with the image 465 of reticle 565 and the image 470 of vernier scale 570. An important advantage of the system last disclosed is that here the ratio between the divisions of the main reticle and of the vernier scale will remain invariable no matter what the distance of the target 441 from the instrument 20, and that the spread of the scales on the plate 441 may be varied by changing the effective length of the path 560. It will be understood, however, that only one of the reticles 565, 570 need be engraved upon the transparent member 541 while the other, e. g. in the manner shown for the scale 265 in Fig. 6, may be provided on the target plate 441. If desired, one of the two co-operating reticles such as 265, 270 (Fig. 6) may be projected upon the target plate via the main optical system while the other is thus projected by way of an auxiliary system such as the system 522. This is shown in Fig. 12 where the scales 665 and 670 are independently projected upon the target 641; it will be noted that this latter arrangement provides maximum flexibility. Thus the spread of the main scale 665 on the plate 641, upon which it is projected by the optical system 522, may be varied by proper displacement of the elements, whereby the sensitivity of the device may be changed; again, the spread of the vernier scale 670 may be adjusted relative to that of scale 665, e. g. for the purpose of obtaining the relationship shown in Fig. 7.

It is to be understood that the invention is not limited to the precise forms shown and described but that it may, on the contrary, be embodied in various modifications and adaptations without departing from its spirit within the scope of the appended claims.

I claim:

1. In a weighing scale, in combination, a movable indicating member, a transparent element on said member, said transparent element bearing a distinctive mark, a target plate remote and detached from said indicating member, said target plate bearing a calibrated scale, and optical means for projecting an image of said distinctive mark upon said target plate; said target plate being provided with a main scale and an auxiliary scale, said optical means projecting a first image of said distinctive mark over a relatively long path upon said target plate, in registry with said main scale, and further projecting a second image of said distinctive mark over a relatively short path upon said target plate, in registry with said auxiliary scale, said two scales being calibrated to give corresponding "fine" and "coarse" readings at the locations of the respective images.

2. In a weighing scale, in combination, a movable indicating member, a first transparent element on said member, said transparent element bearing a distinctive mark, a second transparent element remote and detached from said indicating member, said second transparent element bearing a scale, a target plate remote and detached from both of said transparent elements, first optical means for projecting an image of said distinctive mark upon said target plate, and second optical means for projecting an image of said scale upon said target plate.

3. The combination according to claim 2 wherein said distinctive mark is in the form of a scale, the images of said two scales bearing vernier relation to each other.

4. The combination according to claim 2, comprising a slider adjacent said second transparent element, said slider bearing a transparent vernier scale co-operating with the first mentioned scale, said second optical means being adapted to project an image of said vernier scale as well as of said first-mentioned scale upon said target.

IRVING FEUER.

REFERENCES CITED

The following references are of record in the file of this patent:

UNITED STATES PATENTS

| Number | Name | Date |
|---|---|---|
| 1,357,731 | Schaper | Nov. 2, 1920 |
| 1,893,421 | Latzko et al. | Jan. 3, 1933 |
| 1,974,606 | Fassin | Sept. 25, 1934 |
| 2,116,217 | Schwarz | May 3, 1938 |
| 2,322,813 | Beck | June 29, 1943 |
| 2,335,200 | Sullivan | Nov. 23, 1943 |
| 2,350,622 | Katz | June 6, 1944 |
| 2,422,611 | Becker et al. | June 17, 1947 |
| 2,489,789 | Korkosz | Nov. 29, 1949 |